(No Model.)
G. WILLIAMSON.
APPARATUS FOR SAWING PRINTERS' BLOCKS.
No. 296,372. Patented Apr. 8, 1884.
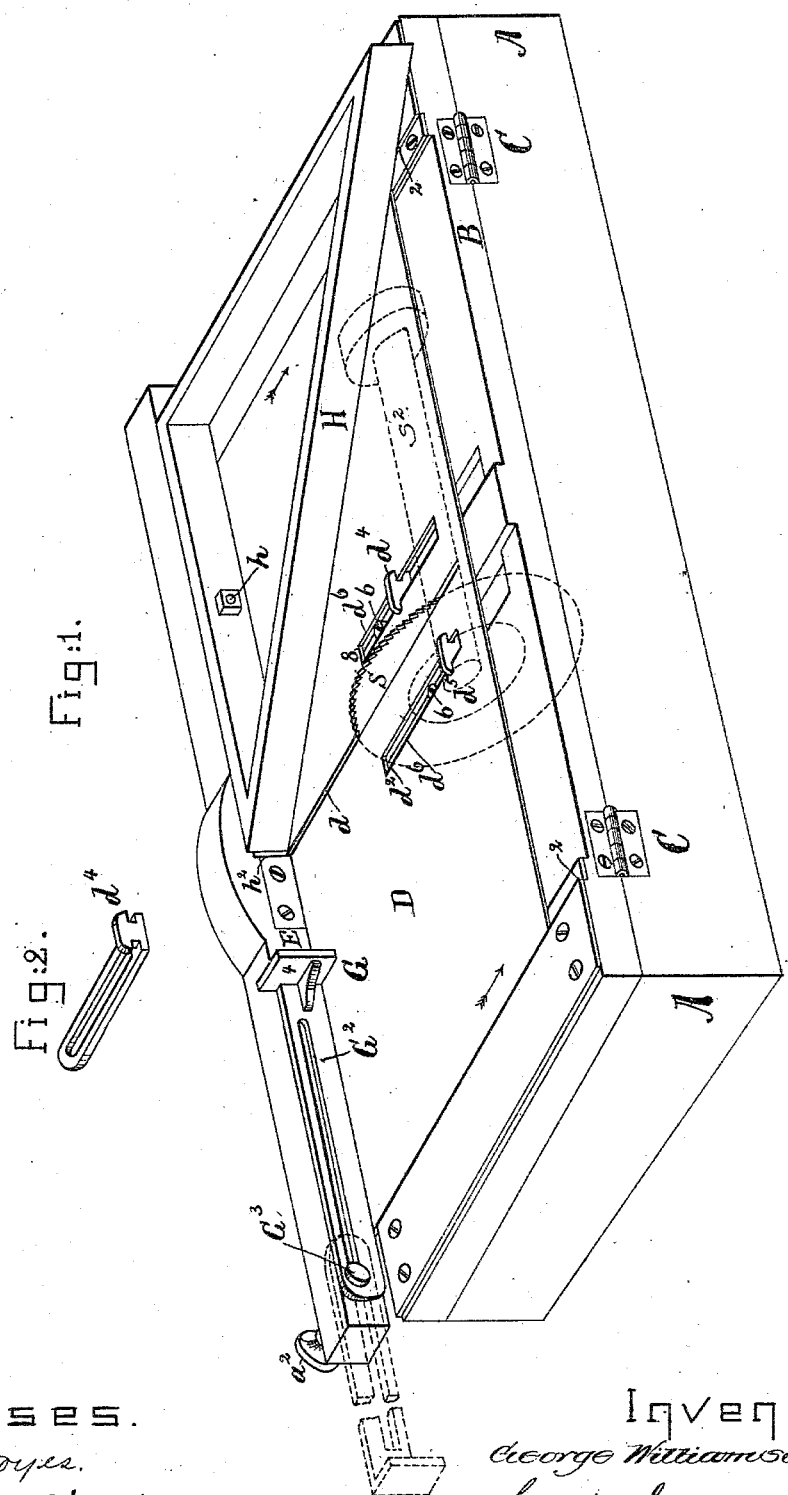
Witnesses.
B. J. Noyes.
John F. C. Preinkert
Inventor.
George Williamson.
By Crosby & Gregory
attys.

UNITED STATES PATENT OFFICE.

GEORGE WILLIAMSON, OF CAMBRIDGE, ASSIGNOR TO J. O. HAYDEN, OF SOMERVILLE, MASSACHUSETTS.

APPARATUS FOR SAWING PRINTERS' BLOCKS.

SPECIFICATION forming part of Letters Patent No. 296,372, dated April 8, 1884.

Application filed July 30, 1883. (No model.)

*To all whom it may concern:*

Be it known that I, GEORGE WILLIAMSON, of Cambridge, county of Middlesex, State of Massachusetts, have invented an Improvement in Apparatus for Sawing Printers' Blocks, of which the following description, in connection with the accompanying drawings, is a specification, like letters on the drawings representing like parts.

This invention has for its object the production of a simple and efficient apparatus for sawing or cutting metal for use in printing and other establishments—such use, for instance, as sawing or notching printers'-rule material, and forming spacing-pieces to justify with type, and for other purposes.

My improved apparatus contains a circular saw having its bearings in a suitable framework, and having its edge extended up through a long slot in a transversely-sliding rule or work support, fitted to slide in suitable guides of a bed-plate, the work-support being provided along one edge with a rest opposed to the saw for one side or edge of the metal rule or other article while being sawed, and also with an adjustable gage for the end of the rule or article, the said work-support and bed-plate having combined with them a stop to limit the extent of its movement forward toward the saw and its mandrel, and preferably backward away from the said saw, the latter stops, as well as the gage, being made adjustable according to the work to be done.

Printers' rules are now commonly cut either by a small straight metal saw-blade held in a stiff back and operated by hand, or by an expensive power-operated machine.

The machine herein described may be used rapidly and with ease to divide metal for metal rules into long or short pieces, to be used as separating-strips for paragraphs or columns, or merely as spacing-pieces to justify with type, the saw cutting the metal rule with such accuracy (the rule being held firmly in position upon the sliding bed) as to make the end of the rule or spacing-pieces sufficiently smooth and straight for the purposes intended without subsequent shaving and filing, which is customarily necessary where the rules are divided by hand.

Figure 1, in perspective, represents a sufficient portion of a rule-sawing mechanism to enable one skilled in the art to understand the construction of the same, the legs supporting the top or table of the machine being omitted; and Fig. 2 is a detail representing one of the guides for the sliding table.

In the drawings, A represents the upper or top part of a suitable table or stand, (herein shown without legs,) and upon which is applied my improvement. A bed-plate or lid, B, is shown as hinged to the top part, A, by hinges C, the said lid having guideways or shoulders at 2, to receive the ends of the sliding rule or work support D, (shown as having a transverse slit, $d$, cut through it from one to nearly its opposite edge, into which the saw is extended and works when the work-support D is moved in the direction of the arrow thereon.) The edge of the work-support D is provided with an upright wall or rest, E, and with a longitudinally-movable gage, G, having a face to receive against it the end of the rule or article being sawed, the said gage having a slitted shank, $G^2$, which receives through it a screw-bolt, $G^3$, extended through the rest E, and provided with a nut, $a^2$. The slot $G^2$ enables the gage to be adjusted longitudinally with relation to the slit $d$, in which the saw works, and if the rule or article to be sawed is longer than the distance between the slit $d$ and the screw $G^3$, the gage may be reversed, as in dotted lines, bringing its inner side or part, 4, in position to face the slit $d$, to receive against it the end of the rule.

In operation, if a rule is to be cut off, it will be placed between the rest E and edge of the saw, and then the ear $d^4$ will be set so that the end 8 of the slot $d^6$ will strike it just as the saw passes through the rule; but if the saw is to cut but part way through the rule, as will be necessary for the production of dash-rules, then, to produce all the said dash-rules of the same size, the ear or stop $d^4$ will be adjusted so as to leave between it and the end 8 of the slot $d^6$ a space just equal to the depth of the incision to be cut into the edge of the rule. The ear or stop $d^5$ acts to check the movement of the work-support in the direction opposite that designated by the arrow, or when the rule is being moved away from the saw. The metal rule or other article to be sawed will be held snugly between the face of the work-support and the upright face of the rest E.

To adapt the apparatus to saw miters I have provided a miter-gage, H, which at one edge is adjustably connected with the rest E by a suitable bolt, h.

I may provide the rest E with one such gage H at each side the saw-receiving slit $h^2$, which is a continuation of the slit d. The mandrel $S^2$ of the saw S (the former shown in dotted lines) is supported in suitable bearings attached to the part C, the said mandrel in practice having a suitable belt-pulley to be driven by a belt from a fly-wheel operated, preferably, by a foot-treadle.

I claim—

1. The bed-plate, saw, and the sliding rule or work support provided with the rest E and a slit for the saw, combined with an adjustable stop to determine the distance between the edge of the saw and the said rest when a rule is to be but partially cut through, substantially as described.

2. In an apparatus for cutting printers' rules, the top, the saw, the bed-plate, sliding rule or work support provided with rest E, saw-slit d, and slot $d^6$, and the adjustable gage connected therewith, combined with the adjustable stop $d^4$, substantially as described.

3. In an apparatus for sawing printers' rules, the sliding rule or work support provided with the rest E, combined with the gage G, having a slotted shank and made reversible, substantially as described.

In testimony whereof I have signed my name to this specification in the presence of two subscribing witnesses.

GEO. WILLIAMSON.

Witnesses:
  JOS. P. LIVERMORE,
  B. J. NOYES.